United States Patent
Nordström

[11] Patent Number: 5,918,703
[45] Date of Patent: Jul. 6, 1999

[54] LOW-LIFTING INDUSTRIAL TRUCK

[76] Inventor: Sven Nordström, Ringvägen 21, Hudiksvall S-824 33, Sweden

[21] Appl. No.: 08/952,485
[22] PCT Filed: May 24, 1996
[86] PCT No.: PCT/SE96/00681
§ 371 Date: Nov. 19, 1997
§ 102(e) Date: Nov. 19, 1997
[87] PCT Pub. No.: WO96/37398
PCT Pub. Date: Nov. 28, 1996

[30] Foreign Application Priority Data

May 24, 1995 [SE] Sweden .................................. 9501935

[51] Int. Cl.$^6$ ........................................................ B66F 9/06
[52] U.S. Cl. .......................... 187/231; 187/222; 187/234
[58] Field of Search ..................................... 187/231, 234

[56] References Cited

U.S. PATENT DOCUMENTS

| 3,170,706 | 2/1965 | Nichols . | |
|---|---|---|---|
| 3,202,233 | 8/1965 | Dolphin et al. | 187/231 X |
| 5,354,080 | 10/1994 | Jones . | |
| 5,722,511 | 3/1998 | Wakamiya | 187/231 |
| 5,752,584 | 5/1998 | Magoto et al. | 187/231 X |

FOREIGN PATENT DOCUMENTS

| 1173431 | 2/1959 | France . |
|---|---|---|
| 1207161 | 2/1960 | France . |
| 953600 | 8/1953 | Germany . |
| 1210537 | 2/1966 | Germany . |
| 1956318 | 12/1970 | Germany . |

*Primary Examiner*—William E. Terrell
*Assistant Examiner*—Gene O Crawford
*Attorney, Agent, or Firm*—Young & Thompson

[57] ABSTRACT

A low-lifting industrial truck with a driving unit having two wheels and two jibs protruding from a front thereof. The jibs are attached to a vertical frame (5), which is vertically movable in relation to the driving unit by means of a hydraulic cylinder (8). The frame (5) is connected, through links (11, 12), to a cradle (10) included in the driving unit (1), the cradle is connected, by a hinge (15), to a cross bar (16) which, at opposite ends, is, through steering pins, connected to side stands (17, 17') being supported by drivable wheels (2, 2') which are rotatably mounted in bearings. The jib having a rolling device with vertically acting hydraulic cylinders which allow each individual jib to be raised and lowered in relation to the rolling device.

6 Claims, 4 Drawing Sheets

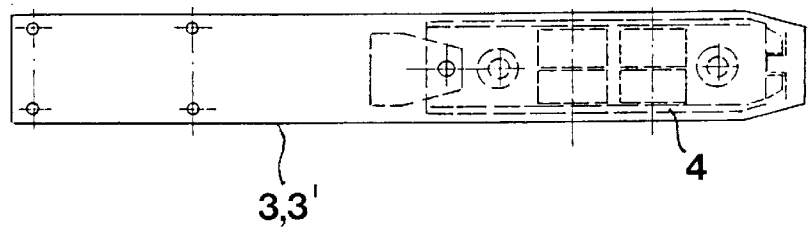
Fig 9
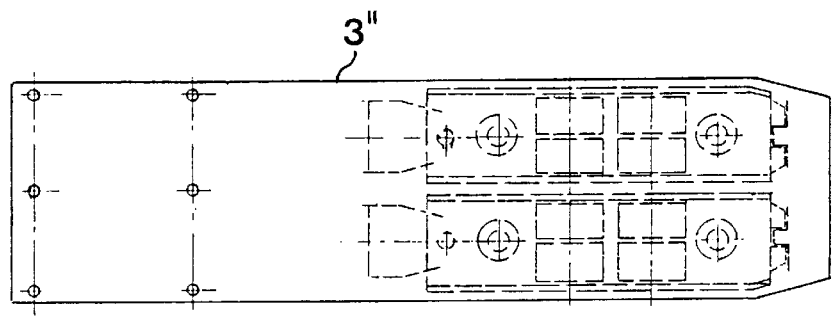
Fig 10
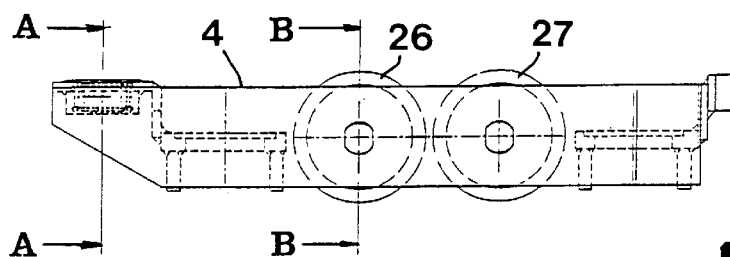
Fig 11
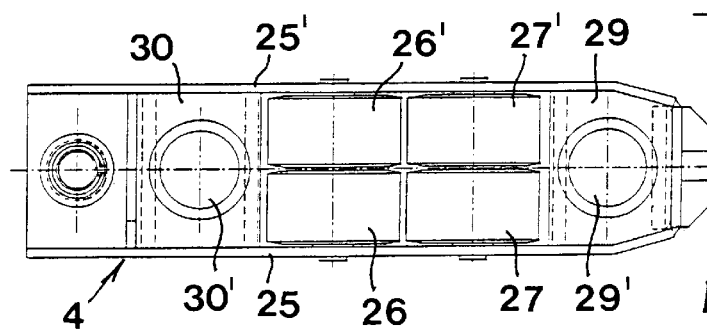
Fig 12
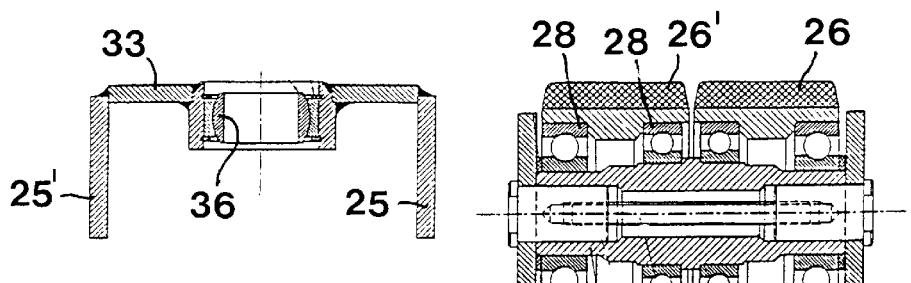
Fig 13
Fig 14

5,918,703

LOW-LIFTING INDUSTRIAL TRUCK

TECHNICAL FIELD OF THE INVENTION

This invention relates to a low-lifting industrial truck comprising on one hand a driving unit having two wheels, and on the other hand at least one jib protruding from a front thereof, said jib being, at a rear end, attached to an upright frame, which is vertically movable in relation to the driving unit by means of at least one hydraulic cylinder, the jib having a rolling device in the vicinity of its frontal free end, in connection with which there are means for raising and lowering the jib relative to the rolling device.

Generally, the purpose of low-lifting industrial trucks is to lift above all heavy loading objects only a short distance above the ground of the industrial truck and to transport the lifting object limited distances along the ground; most commonly in factory and warehouse premises.

PRIOR ART

A low-lifting industrial truck of the kind initially referred to is known by DE 4310257. This known construction comprises two parallel jibs which are connected to a vertical frame which is guided by vertical guides in the driving unit. The rolling devices at the free end portions of the jibs are raised and lowered by means of swinging mechanisms which are affected by rods, which rods have, at the rear ends thereof, rolls abutting against the bottom part of the driving unit. When the frame is raised relative to the driving unit, the rods and the swinging mechanisms guarantee a simultaneous lowering of the rolling devices in relation to the jibs so that the jibs are raised along their entire length more or less in parallel to the ground. The driving unit in this known construction comprises two wheels, one of which is drivable and steerable while the other one consists of a simple support wheel. The two wheels are mounted, in the main, vertically immovable in relation to the driving unit. This means that the known industrial truck requires, in all essentials, completely plane ground surfaces to be able to be impeccably driven. Namely, if anyone of the four rolling elements carrying the industrial truck, viz. the two wheels and the two rolling devices at the free ends of the jibs, is driven over a hollow, an elevation or another unevenness of the ground, the industrial truck in its entirety will sway at the same time as considerable breaking stress may arise in connection with the guides between the frame and the driving unit. Therefore, a reliable transport of, in particular, heavy loading objects on uneven ground surfaces is not possible with the industrial truck disclosed in DE 4310257.

OBJECTS AND FEATURES OF THE INVENTION

The present invention aims at removing the above-mentioned disadvantage of the known industrial truck and at creating an improved industrial truck. Thus, a primary object of the invention is to create an industrial truck which may be driven on uneven ground surfaces without causing marked sways and without causing annoying strains in the construction.

According to the invention the above-mentioned object is attained by the features defined in the characterizing clause of claim 1. Preferred embodiments of the invention are furthermore defined in the dependent claims.

BRIEF DESCRIPTION OF THE APPENDED DRAWINGS

In the drawings:

FIG. 1 is a schematic side view of a low-lifting industrial truck according to the invention, FIG. 2 is a schematic planar view from above of said industrial truck, FIG. 3 a partial, enlarged side view showing the frame and the jibs of the industrial truck in a lower, inactive lifting position, FIG. 4 is a similar side view showing the frame and the jibs in an upper, active lifting position, FIG. 5 is a rear end view seen from the left in FIG. 3, illustrating vital components included in the driving unit of the industrial truck, FIG. 6 is an exploded view showing a cross bar included in the driving unit together with two appurtenant side pieces, FIG. 7 is a schematic longitudinal section showing a jib in an inactive position, FIG. 8 is a corresponding longitudinal section showing the same jib in an active position, FIG. 9 is a schematic planar view from above showing an individual jib according to a first embodiment, FIG. 10 is a similar planar view showing an alternative, wider embodiment of a jib, FIG. 11 is a schematic side view illustrating a rolling device included in a jib, FIG. 12 is a planar view of the rolling device according to FIG. 11, FIG. 13 is an enlarged cross-section A—A in FIG. 11, and FIG. 14 is an enlarged cross-section B—B in FIG. 11.

DETAILED DESCRIPTION OF A PREFERRED EMBODIMENT OF THE INVENTION

Figure 1:
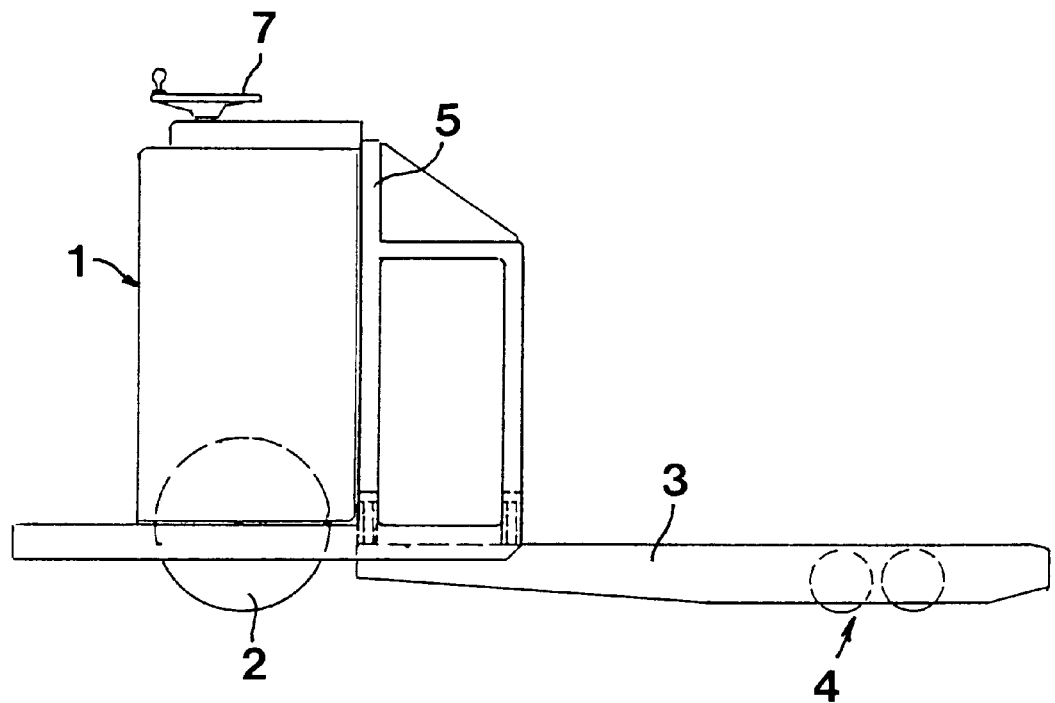
Figure 2:
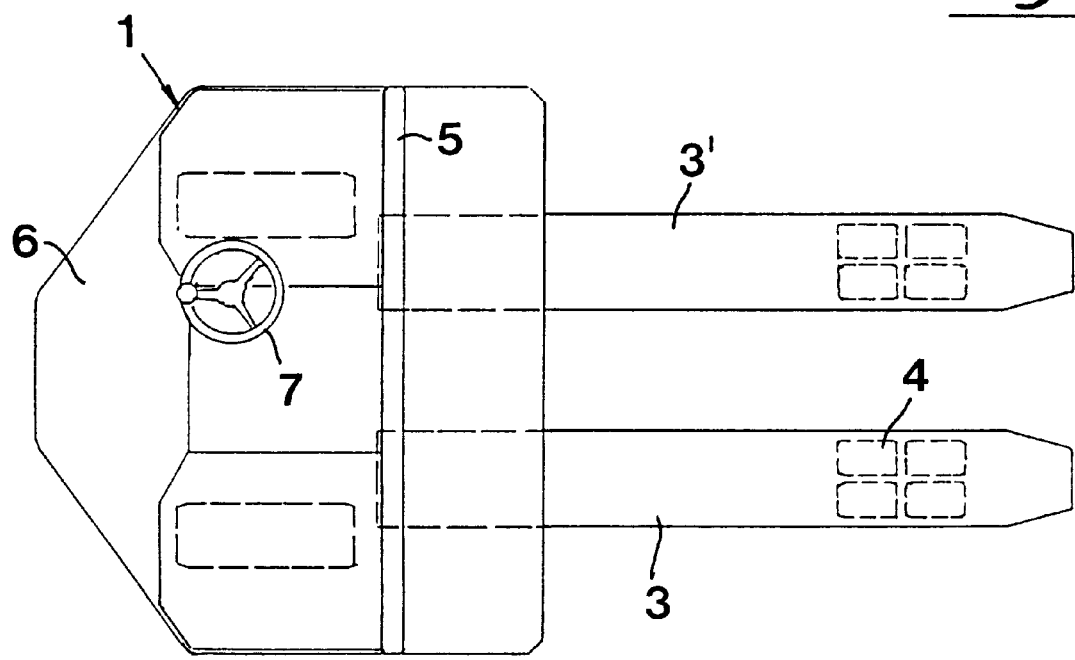

In FIG. 1 and 2, reference numeral 1 generally designates a driving unit having two wheels 2, 2', both of which are drivable and steerable. Two jibs 3, 3' protrudes forwardly from a front of the driving unit 1, said jibs including rolling devices 4 in the area of the frontal free end portions thereof. The jibs 3, 3' are, at the rear ends thereof, connected to a vertical or upright frame 5. The operator may stand on a platform 6 and steer the industrial truck by means of a steering-wheel 7. It should be noted that the platform is rigidly connected to the frame 5 and comes along with said frame in the vertical movements thereof. Of course, also the rear end portions of the jibs 3, 3' come along with the frame 5 in the vertical movements thereof relative to the driving unit 1.

Reference is now made to FIGS. 3 to 6 illustrating the construction of the driving unit 1. Lifting and lowering of the frame 5 —and accordingly also the rear ends of the jibs 3, 3'—is done by means of at least one hydraulic cylinder 8 which may be either single-acting or double-acting. One end of the hydraulic cylinder is articulatedly connected to a bracket 9 on the back side of the frame 5, while the other end, viz. the piston rod end, is articulatedly connected to a cradle or cradle-like construction, designated 10 in its entirety. Links 11, 12 extend between the frame 5 and the cradle 10, said links being, at opposite ends, articulatedly connected to the frame and the cradle respectively. The proper cradle includes two mainly L-shaped side pieces 13, 13' which are interconnected by cross plates 14 which carry an articulation shaft designated 15. The articulation shaft 15 co-operates with one or more lugs 15' protruding from the bottom side of a cross bar 16. The cross bar 16 is, at the opposite ends thereof, through vertical pivot pins, connected to side stands 17, 17' which, in addition to a vertical rib 18, comprise two separated and laterally protruding arms 19, 20. The ends of the cross bar 16 are inserted between these pairs of arms 19, 20. The wheels 2, 2' are located on the inside of the rib 18 of the side stands and rotatably mounted in bearings therein in a conventional way. Thus, the wheels 2, 2' carry the side stands together with the intermediate cross bar 16. Motors 21, 21', e.g. electric motors, are arranged on each of the side stands 17, 17', each motor being separately connected to the wheels 2, 2' through transmissions 22, e.g. chain or belt transmissions, for power transmission to the wheels.

It should be evident that the two wheels 2, 2' are drivable as well as steerable by swinging the side stands 17, 17' relative to the appurtenant hinges at the ends of the cross bar. In practice, the wheels 2, 2' are steerable in parallel by means of conventional tie rods which are not shown in the drawings.

Brackets 23, 23' are arranged on the outside of the side pieces 13, 13' of the cradle 10. Between the bottom side of the cross bar 16 and each such bracket, there is a resilient damper element 24, e.g. a rubber body, having the purpose of damping oscillations of the cross bar relative to the cradle 10.

The lower link 11 may consist of one single thick link body of a considerable width, i.e. an extension across the length extension of the industrial truck. The link arrangement 12 may consist of two single link plates on each side of the cradle 10.

Figure 3:
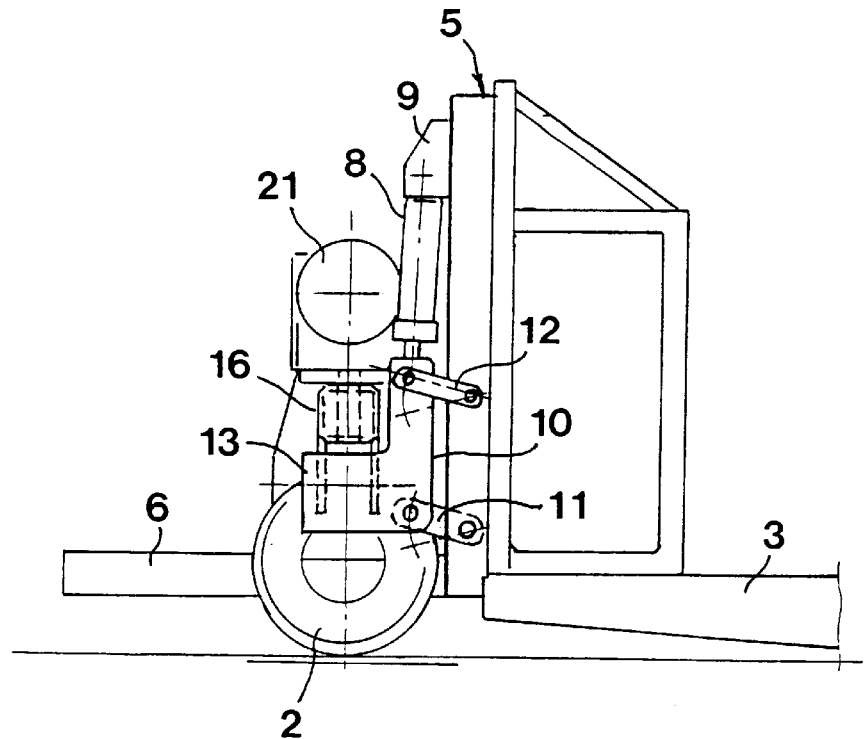
Figure 4:
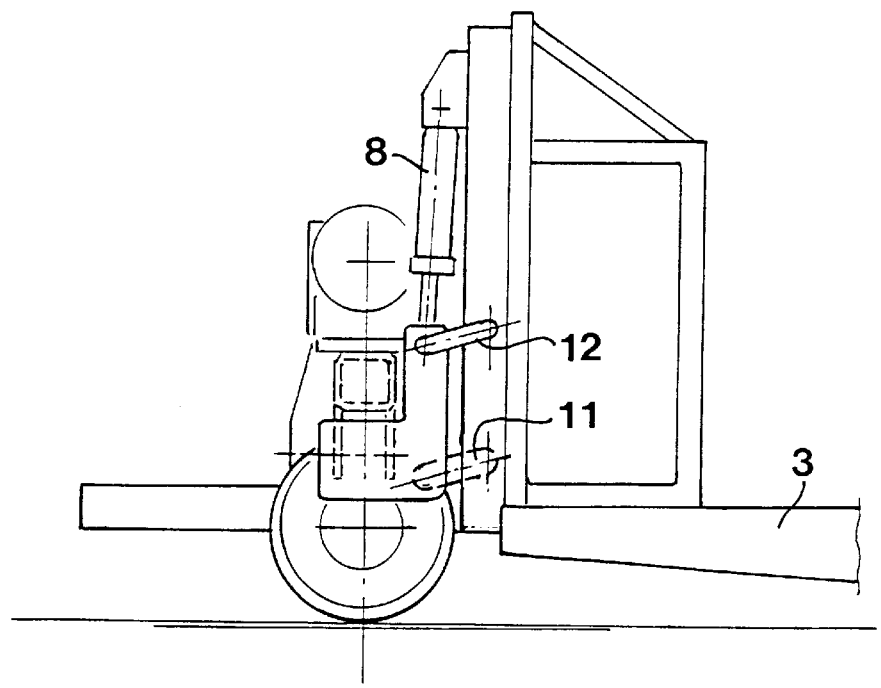
Figure 5:
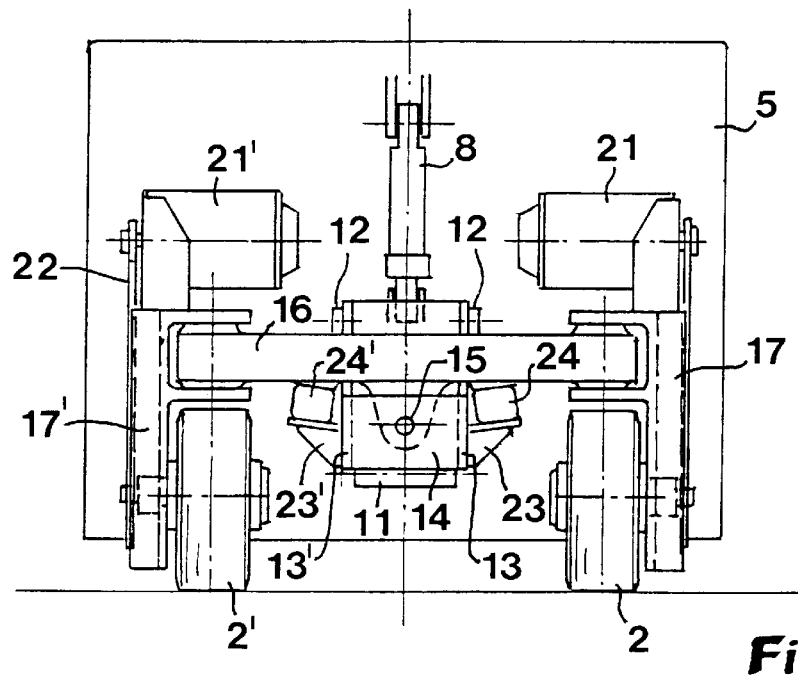
Figure 6:
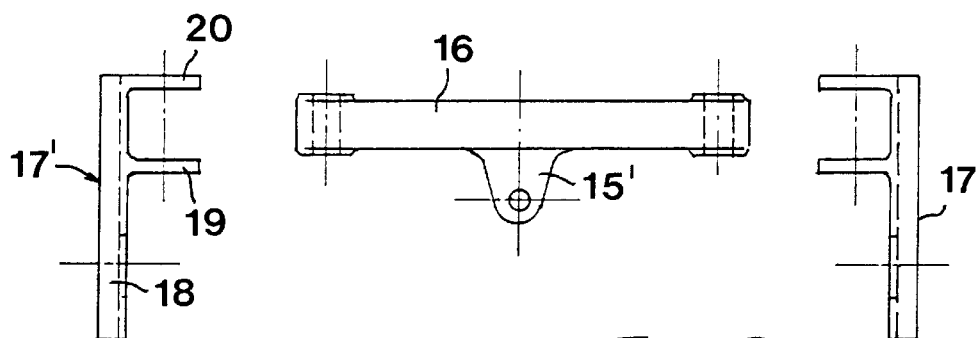

FIGS. 3 and 4 show that an extension of the hydraulic cylinder 8 entails that the frame 5 is raised or lifted relative to the surface, the links 11, 12 allowing such lifting at the same time as they connect or hold the frame 5 and the driving unit 1 together. Shortening of the hydraulic cylinder entails, in an opposite way, that the frame 5 is lowered relative to the surface.

Figure 7:
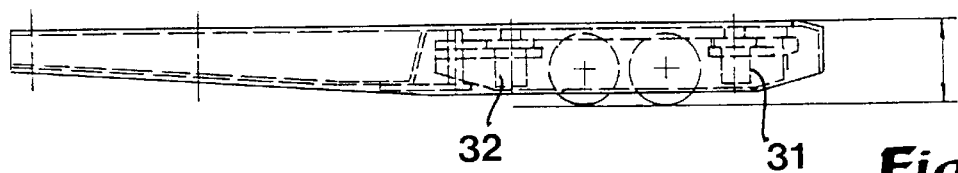
Figure 8:
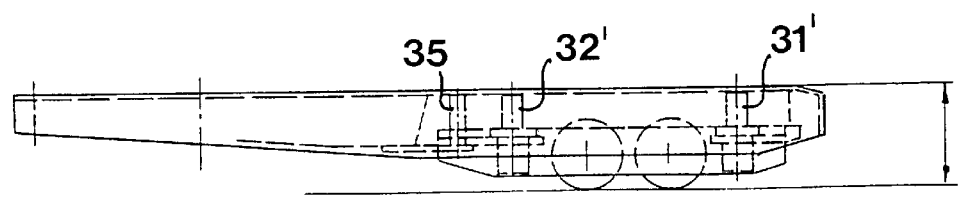

Reference is now made to FIGS. 9 to 14 which in detail illustrate the nature of the jib and the rolling device of the industrial truck. In FIG. 9 it is illustrated how the jib 3 and 3' respectively includes one single rolling device 4. Said device has the shape of a bogie (see FIGS. 11 and 12) having two side pieces or plates 25, 25' between which two axially separated pairs of rolls or rolling elements 26, 26' and 27, 27' respectively are rotatably mounted in bearings. As may be seen in the enlarged cross-section in FIG. 14, a thick shaft extends between the side pieces 25, 25' outside of which the rolling elements 26, 26' are rotatably mounted in bearings 28. At the frontal and rear ends of the bogie 4, the side pieces 25, 25' are kept together by cross pieces 29, 30 in the form of lying plates. There are holes 29' and 30' respectively in the same plates for vertically acting hydraulic cylinders 31, 32 which are shown in FIGS. 7 and 8.

The individual jib has a cross-section-wise U-shape turned upside-down in that the same is composed of a horizontal rib and two side flanges protruding downwards therefrom. In the section A—A, also the bogie 4 has a U-shape turned upside-down in that a horizontal rib 33 is connected to the side pieces 25, 25'. When the two cylinders 31, 32 are activated by the fact that appurtenant piston rod 31' and 32' respectively are pushed out from the cylinder, the piston rod presses the horizontal rib of the jib and thereby the jib in its entirety in the direction upwards from the ground. Shortening of the hydraulic cylinders 31, 32 permits lowering of the outer part of the jib.

It may also be noted that the individual bogie 4, at the rear end thereof, is connected to the jib by a dog pin 35 which engages into an externally spherical ring 36 (see FIG. 13) allowing the jib to swing or tilt in relation to the bogie. The bogie 4 is laterally turnable relative to the jib through the pin connection 35, more precisely within the ranges determined by the distance between the side pieces of the jib.

When the industrial truck, as is shown in FIG. 2, comprises two separated, mutually parallel jibs 3, 3', the free end portions of the jib are individually vertically movable by individual adjustment of the two pairs of hydraulic cylinders 31, 32 in each rolling device respectively. Advantageously, the hydraulic cylinders in the pair of cylinders should communicate with each other. In that way, the axially separated rolling elements will be equally loaded even if they are driven on an uneven ground surface.

The described industrial truck works in the following manner. When a loading object, e.g. a pallet or a cable drum, is to be moved by means of the industrial truck, the jibs 3, 3' are inserted under the object, and then lifting thereof is executed by means of on one hand the hydraulic cylinder 8 between the frame 5 and the driving unit 1, and on the other hand the pairs of hydraulic cylinders 31, 32 in the area of the outer free ends of the two jibs. In a raised position, the jibs take the positions as is shown in FIGS. 4 and 8. In practice, the jibs are raised about 50–100 mm. In this position, the object may be transported by the fact that the wheels 2, 2' (which may consist of rubber wheels) are driven by the motors 21, 21' at the same time as the operator steers the industrial truck by means of the steering-wheel 7. If anyone of the wheels 2, 2' or anyone of the rolling devices 4 respectively would pass unevennesses in transport, annoying sways or strains on the construction will not emerge. Thus, the two wheels 2, 2' are turnably movable in relation to the central hinge 15, implying that the frame 5 together with appurtenant jib may, in the main, keep the position thereof relative to the surface, at the same time as the wheels are moving in a vertical direction. In other words, the two jibs assumes a "floating" condition relative to the driving wheel in transport. By the fact that the hydraulic cylinders act directly against the horizontal ribs of the jibs, a large, effective lifting power is obtained in the whole range from a lowered to a raised position of the jibs.

In FIG. 10 an alternative embodiment of a jib is shown having an enlarged width, said jib comprising two rolling devices arranged beside each other, so as to obtain an increased carrying capacity. Such a wider jib may, where appropriate, replace two thinner jibs.

FEASIBLE MODIFICATIONS OF THE INVENTION

The invention is not restricted to the embodiments described and shown in the drawings. Thus, it is feasible to, e.g., arrange the rear ends of the jibs cross sliding relative to the appurtenant frame to make a change of the mutual distance between the jibs possible. It is also conceivable to realize the rolling devices at the free ends of the jibs in another way than the one exemplified in the drawings.

I claim:

1. Low-lifting industrial truck comprising a frame a driving unit (1) having two desirable wheels (2, 2'), and bearings for rotatably mounting the wheels, a cradle, at least one jib (3, 3', 3") protruding from a front thereof, said jib attached at its rear end to an upright frame, links (11,12) which connect the jib to the driving unit, at least one hydraulic cylinder (8) for vertically moving the jib in relation to the driving unit (1), the jib having a rolling device (4) in the vicinity of its frontal free end, and a means (31, 32) for raising and lowering the jib relative to the rolling device, characterized in that the links (11, 12) are connected to the cradle (10) included in the driving unit (1), a hinge (15), a crossbar (16), side stands (17,17') and steering pins connecting said cradle by the hinge (15), to the cross bar (16) at opposite ends, the through the steering pins, connected to the side stands (17, 17') being supported by the drivable wheels (2, 2') which are rotatably mounted in bearings, the rolling rolling device (4) having the shape of a bogie, one or more rolling elements (26,27) rotatably mounted, having two side pieces (25, 25') relative to the one or more rolling elements (26, 27) and vertically acting hydraulic cylinders (31, 32) arranged in front of and behind the one or more rolling elements which allow the individual jib to be raised and lowered in relation to the rolling device.

2. Industrial truck according to claim 1, characterized in that the cradle (10) comprises two mainly L-shaped side pieces (13, 13'), cross plates (14) and at least one lug (15'), the side pieces are interconnected by the cross plates (14) carrying an articulation shaft (15) which co-operates with the at least one lug (15') protruding downwards from the cross bar (16).

3. Industrial truck according to claim 2, characterized in that protruding brackets (23, 23') are arranged on the outside of the side pieces (13, 13') and that, between the bottom side of the cross bar (16) and the brackets, there are resilient damper elements (24, 24'), having the purpose of damping oscillations of the cross bar in relation to the cradle.

4. Industrial truck according to claim 3, wherein said damper elements comprise rubber bodies.

5. Industrial truck according to any one of the preceding claims, characterized in that the individual side stand (17, 17') comprises a vertical, wheel-carried rib (18), two separated, laterally protruding arms (19, 20), between which one end of the cross bar (16) is inserted and movable through a vertical pivot point.

6. Industrial truck according to claim 5, characterized in that each side stand (17, 17') carries a driving motor (21, 21') and a power transmission (22), the driving motor, connected to the wheel (2, 2') by the power transmission (22).

* * * * *